United States Patent [19]

Israel

[11] Patent Number: 5,139,455
[45] Date of Patent: Aug. 18, 1992

[54] VISUAL TOY HAVING A REFLECTIVE SURFACE FOR EXHIBITING A VARIABLE COLORATION IN RESPONSE TO ORIENTATION OF THE TOY

[75] Inventor: Cheryl A. Israel, East Aurora, N.Y.

[73] Assignee: Fisher-Price, Inc., East Aurora, N.Y.

[21] Appl. No.: 743,453

[22] Filed: Aug. 9, 1991

[51] Int. Cl.⁵ .................. A63H 33/22; A63H 5/00; G09B 25/00; A63J 3/00
[52] U.S. Cl. .................. 446/219; 434/371; 472/63
[58] Field of Search ............... 446/219, 267, 397, 418, 446/419, 420, 421, 422; 272/8 R, 8 M; 434/303, 371

[56] References Cited

U.S. PATENT DOCUMENTS

| | | | |
|---|---|---|---|
| 995,607 | 6/1911 | Kempinski | 272/8 M |
| 2,115,986 | 5/1938 | Da Costa | 446/219 |
| 2,430,318 | 11/1947 | Zimmerman | 446/219 X |
| 3,166,973 | 1/1965 | Healey | 272/8 R |
| 3,632,108 | 1/1972 | Wilson | 272/8 M X |
| 3,647,284 | 3/1972 | Elings et al. | 272/8 M X |
| 3,759,607 | 9/1973 | Boyle | 272/8 M X |
| 4,023,794 | 5/1977 | Adams | 272/8 M |
| 4,277,139 | 7/1981 | Cox | 272/8 M X |
| 4,898,560 | 2/1990 | Moscovich | 446/219 X |
| 4,915,663 | 4/1990 | Magers | 446/219 |

FOREIGN PATENT DOCUMENTS 2221626 2/1990 United Kingdom ............... 446/219

Primary Examiner—Robert A. Hafer
Assistant Examiner—D. Neal Muir
Attorney, Agent, or Firm—Cumpston & Shaw

[57] ABSTRACT

A visual toy having a concave reflective surface affixed to a transparent cover to enclose a volume. A color imparting member is movably disposed within the enclosed volume. The concave reflective surface and color imparting member are configured so that substantially the entire portion of the reflective surface visible from any sight line may exhibit the color of the color imparting member.

11 Claims, 2 Drawing Sheets

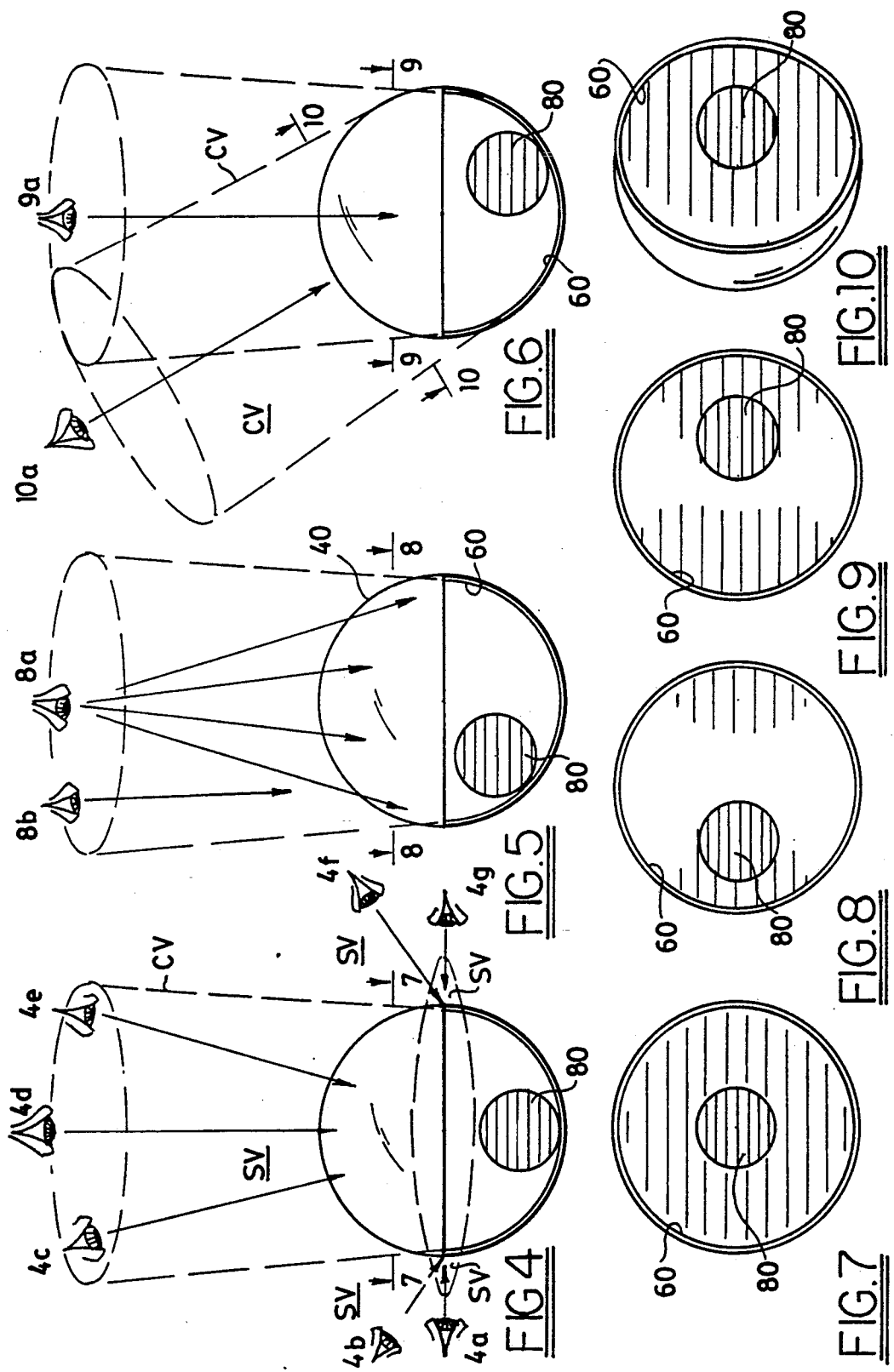

VISUAL TOY HAVING A REFLECTIVE SURFACE FOR EXHIBITING A VARIABLE COLORATION IN RESPONSE TO ORIENTATION OF THE TOY

The present invention relates toys, and more particularly, to a toy having a visual display which varies in response to orientation of the toy relative to an observer.

BACKGROUND OF THE INVENTION

Many toys provide children with visual, tactile and acoustic stimulation. The combination and variation of these three sensory perceptions provide a virtually unlimited array of toys. For example, rattles often amuse infants through the production of a variety of acoustic signals in response to orientation of the rattle by the child. In addition, the rattles may be configured to provide handles, or other configurations easily grasped by infants or young children.

Alternatively, many toys include reflective surfaces which providing visual stimulation in response to either orientation of the toy, or movement of an independent member relative to the toy.

SUMMARY OF THE INVENTION

The present invention includes a visual toy for producing a variable visual and acoustic response.

Specifically, the present invention includes an at least partially enclosing retaining volume having a concave reflective surface. The reflective surface is visible from a plurality of sight lines which define a sight volume. The sight volume includes any sight line from which at least a portion of the reflective surface is visible to an observer. A color imparting member cooperates with the reflective surface to produce a variety of images. The color imparting member has a size and shape such that substantially the entire portion of reflective surface visible along a given sight line exhibits the color of the color imparting member, thereby defining a color volume wherein the color volume comprises a portion of the sight volume. Preferably, the color imparting member has a sufficient hardness so that the member acts as a rattle within the retaining volume, thereby providing acoustic stimulation.

BRIEF DESCRIPTION OF THE DRAWINGS

FIG. 4 is a schematic cross sectional side elevational view of the reflective surface and color imparting member showing a color volume and a sight volume;

FIG. 5 is a schematic cross sectional side elevational view of the reflective surface and color imparting member;

FIG. 6 is a schematic cross sectional side elevational view of the reflective surface and color imparting member showing a color volume;

FIG. 7 is a cross sectional view taken along lines 7—7 of FIG. 4;

FIG. 8 is a cross sectional view taken along lines 8—8 of FIG. 5;

FIG. 9 is a cross sectional view taken along lines 9—9 of FIG. 6; and

FIG. 10 is a cross sectional view taken along lines 10—10 of FIG. 6.

DETAILED DESCRIPTION OF THE PREFERRED EMBODIMENTS

Figure 1:
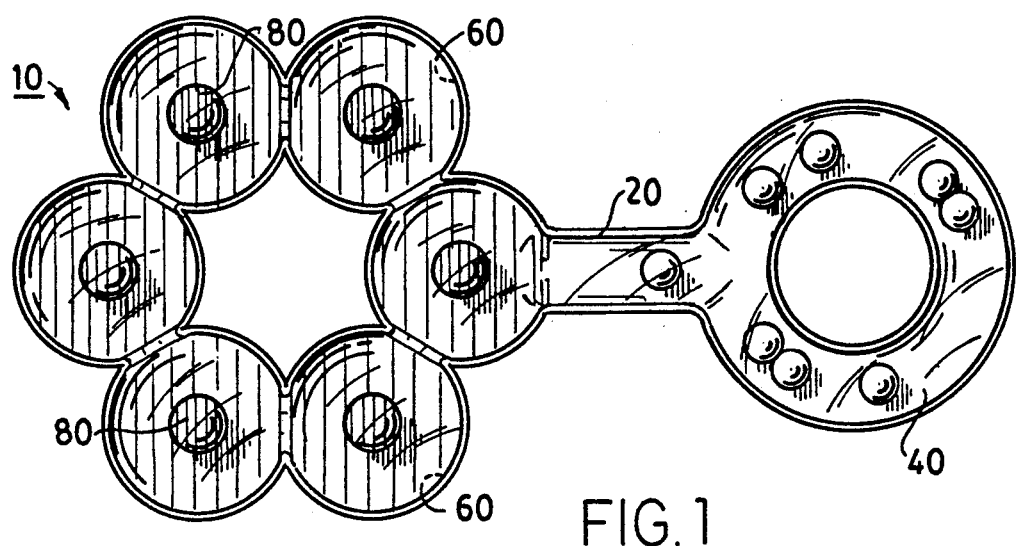
FIG. 1 is a top plan view of a first embodiment of the present invention.

Referring to FIGS. 1, and 3-6, the visual toy 10 of the present invention includes a housing having 20 a transparent cover 40, a reflective surface 60 and a color imparting member 80.

As shown in FIGS. 2-6, the reflective surface 60 has a concave configuration which partially encloses a retaining volume. Preferably, the reflective surface 60 defines a semi-spherical, or parabolic cross section. However, the cross section of the reflective surface 60 may be defined by other mathematical functions.

Figure 2:
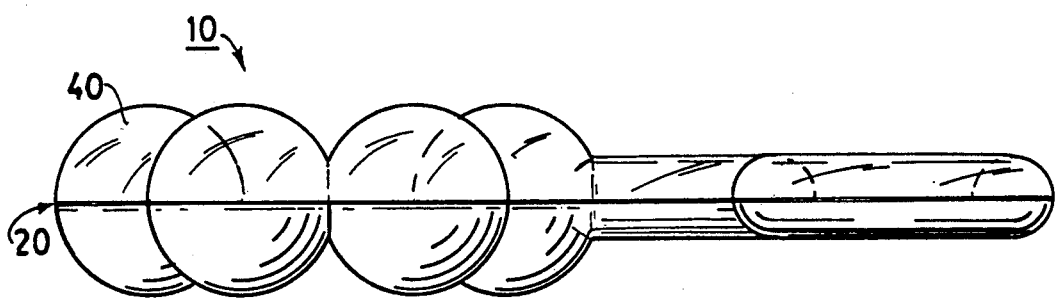
FIG. 2 is a side elevational of the first embodiment of the present invention.

Referring to FIGS. 1 and 2, in a first preferred embodiment, the reflective surface 60 has a radius of curvation of approximately ⅛ inch. In the second preferred embodiment shown in FIG. 3, the reflective surface has a radius of curvation of approximately 15/16 inches. The reflective surface 60 is formed of plastic having a reflective surface applied by vacuum metalization.

Referring to FIGS. 1-6, the transparent cover 40 is affixed to the reflective surface 60 so as to enclose a volume therebetween. The transparent cover 40 has configuration substantially identical to the corresponding reflective surface 60, such that upon affixing the transport cover to the reflective surface 60, the enclosed volume is substantially spherical. The transparent cover 40 is formed of Acrylonitrile Butadiene Styrene (A.B.S.).

Figure 3:
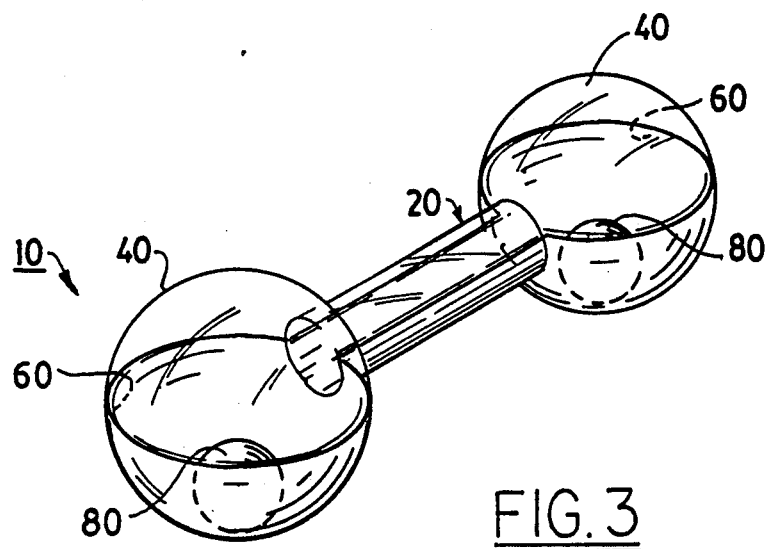
FIG. 3 is a perspective view of a second embodiment of the present invention.

As shown in FIGS. 1, and 3-10, the color imparting member 80 is disposed within the enclosed volume, and is substantially spherical. The color imparting member 80 may roll along the reflective surface 60 to contact any point of the surface. Referring to FIG. 1, in the first embodiment, the color imparting member 80 is defined by a radius of approximately 3/16 inches. As shown in FIG. 3, in the second preferred embodiment, the color imparting member 80 has a radius of approximately 9/32 inches. Therefore, the ratio of the radius of the color imparting member 80 to radius of curvature of the reflective surface 60 is approximately 0.3. The color imparting member 80 is formed of Acrylonitrile Butadiene Styrene (A.B.S.). Preferably, the color imparting member 80 is sufficiently hard so that it acts as a rattle within the volume enclosed by the reflective surface 60 and the transparent cover 40.

As shown in the FIG. 4, the reflective surface 60 is visible from a plurality of sight lines 4a-4g from which at least a portion of the reflective surface 60 is visible. The sight lines define a sight volume SV, that is, the volume which includes all the sight lines along which at least a portion of the reflective surface 60 is visible.

As shown in FIGS. 4 and 7, when the color imparting member 80 is disposed in the lowest portion of the reflective surface 60, those sight lines 4c, 4d and 4e along which substantially the entire portion of the reflective surface is visible exhibit the color of the color imparting member 80. Similarly, as shown in FIG. 1, when the color imparting member 80 is disposed in the bottom of the concave reflective surface 60, and when viewed from above, substantially the entire reflective surface exhibits the color of the color imparting member.

Referring to FIGS. 4 and 7, and 6 and 10, the sight lines along which substantially the entire portion of the reflective surface visible along the given sight lines exhibit the color of the color imparting member define a color volume CV. Referring to FIG. 4, the color volume CV defined by the color imparting member 80 when disposed in the lowest position in the concave reflective surface 60 is a substantially frusto conical volume wherein substantially the entire reflective surface exhibits the color of the color imparting member 80. As shown in FIG. 4, the color volume CV is a portion of the sight volume SV.

Referring to FIGS. 6 and 10, when the reflective surface 60 is viewed from inclined angles 10a, a portion of the reflective surface 60 is hidden, or occluded by the structure of the housing 20. At this inclined viewing angle, only a portion of the reflective surface is visible. However, as shown in FIGS. 6 and 10 the color imparting member 80 is movable relative to the reflective surface 60 to a position such that substantially the entire portion of the reflective surface which is visible along the given sight line 10a exhibits the color of the color imparting member.

As shown in FIGS. 5 and 8, and 6 and 9, along sight lines 8a, 8b, and 9a, which are outside of the color volume, only a small portion of the visible reflective surface 60 exhibits the color of the color imparting member 80, wherein the color volume is a portion of the sight volume.

As shown in FIGS. 4 and 6, the color volume CV comprises only a portion of the total volume of the sight volume SV, and for any position of the color imparting member 80 which defines a color volume, the sight lines within the color volume provide that substantially the entire portion of the reflective surface visible along the given sight lines exhibit the color of the color importing member, and sight lines outside the color volume provide that the color of the color imparting member 80 is substantially absent from substantially the entire visible portion of the reflective surface 60.

Along any sight line within the sight volume SV, the color imparting member 80 may assume a position along the reflective surface 60 such that substantially the entire reflective surface exhibits either the color of the reflective surface, or the color of the color imparting member. That is, for any given position of the color imparting member 80 along the reflective surface 60, the color imparting member 80 defines a color volume in which substantially the entire portion of the reflective surface which is visible exhibits the color of the color imparting member 80.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A toy, comprising:
   (a) a housing including an at least partially enclosing volume having a concave reflective surface, at least a portion of the reflective surface being visible from a plurality of sight lines which define a sight volume; and
   (b) a color imparting member within the volume freely movable to a plurality of positions relative to the reflective surface such that for at least one position of the color imparting member, substantially the entire portion of the reflective surface visible along any given sight line within the sight volume exhibits the color of the color imparting member.

2. The toy of claim 1, wherein the color imparting member is moveable between a first position wherein substantially the entire portion of the reflective surface visible along a given sight line exhibits the color of the color member, and a second position wherein the color of the color imparting member is substantially absent from the portion of the reflective surface visible along the given sight line.

3. The toy of claim 1, further comprising a transparent cover affixed to the housing to retain the color imparting member between the reflective surface and the cover.

4. The toy of claim 1, wherein the reflective surface defines a sight volume which includes any sight line from which at least a portion of the reflective surface is visible, and the color imparting member is movable relative to the reflective surface such that substantially the entire portion of the reflective surface visible along any sight line within the sight volume exhibits the color of the color imparting member.

5. An ornamental toy, comprising:
   (a) a housing having an at least partially enclosing retaining volume having a concave reflective surface wherein the reflective surface defines a sight volume which includes any sight line from which at least a portion of the reflective surface is visible to an observer; and
   (b) a movable color imparting member loosely disposed within the retaining volume between a first and a second position substantially within the retaining volume, the color imparting member having a size and shape so that in the first position substantially the entire reflective surface exhibits the color of the color imparting member where viewed from any line of sight within a color volume, wherein the color volume comprises a portion of the sight volume and in the second position the color of the color imparting member is substantially absent from the entire reflective surface.

6. The ornamental toy of claim 5, wherein the color volume is substantially frusto-conical.

7. The ornamental toy of claim 5, wherein the color imparting member is movable relative to the reflective surface such that for any given sight line within the sight volume, the color imparting member is movable between a first position substantially within the retaining volume wherein the color of the color imparting member is substantially absent from the visible portion of the reflective surface, and a second position substantially within the retaining volume wherein substantially the entire portion of the reflective surface visible along the given sight line exhibits the color of the color imparting member.

8. The ornamental apparatus of claim 5, wherein the color imparting member is substantially spherical.

9. A toy, comprising:
   (a) a housing including a concave reflective surface defining a retaining volume, the reflective surface having a sight volume defined by a plurality of sight lines wherein each sight line is associated with a given focal point as established by said reflective surface; and
   (b) a color imparting member freely movable within the retaining volume relative to the reflective surface between a first position wherein the color imparting member substantially occupies a given focal point such that substantially the entire portion of the reflective surface visible along a given sight line exhibits the color of the color imparting member, and a second position relative to the reflective surface wherein the color imparting member is substantially outside the given focal point.

10. The toy of claim 10, wherein any given sight line within the sight volume corresponds to a given focal point such that upon orientation of the color imparting member at the given focal point, substantially the entire portion of the reflective surface visible along the given sight line exhibits the color of the color imparting member.

11. The toy of claim 9, wherein the color imparting member defines a volume sufficient to intersect the given focal point.

* * * * *